United States Patent
Marya (10) Patent No.: US 11,898,227 B2
(45) Date of Patent: Feb. 13, 2024

(54) HARD NICKEL-CHROMIUM-ALUMINUM ALLOY FOR OILFIELD SERVICES APPARATUS AND METHODS

(71) Applicant: Schlumberger Technology Corporation, Sugar Land, TX (US)

(72) Inventor: Manuel Marya, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 66 days.

(21) Appl. No.: 16/599,144

(22) Filed: Oct. 11, 2019

(65) Prior Publication Data

US 2021/0108294 A1    Apr. 15, 2021

(51) Int. Cl.
  *C22C 29/08*    (2006.01)
  *C22C 19/05*    (2006.01)
(52) U.S. Cl.
  CPC ............ *C22C 29/08* (2013.01); *C22C 19/053* (2013.01); *C22C 19/055* (2013.01)
(58) Field of Classification Search
  CPC ...... C22C 29/08; C22C 19/053; C22C 19/055
  See application file for complete search history.

(56) References Cited

U.S. PATENT DOCUMENTS

| 4,155,782 | A | | 5/1979 | Shimotori et al. |
| 4,400,210 | A | * | 8/1983 | Kudo .................... C22C 38/44 420/451 |
| 5,080,981 | A | * | 1/1992 | Fritscher ................ F01D 5/288 428/633 |
| 5,858,558 | A | | 1/1999 | Zhao et al. |
| 5,993,978 | A | * | 11/1999 | Kim .......................... F01L 1/14 428/553 |
| 6,572,518 | B1 | * | 6/2003 | Midorikawa ............ C23C 4/06 29/895.32 |
| 7,682,474 | B2 | | 3/2010 | Arai et al. |
| 8,685,316 | B2 | | 4/2014 | Sato et al. |
| 2004/0038053 | A1 | * | 2/2004 | Lintunen ................. C22C 1/058 428/472.1 |

(Continued)

FOREIGN PATENT DOCUMENTS

| EP | 3441489 A1 | | 2/2019 |
| JP | 2002069557 A | * | 3/2002 |

(Continued)

OTHER PUBLICATIONS

Ul-Hamid, TEM Study of the Effect of Y on the Scale Microstructures of Cr2O3- and Al2O3-Forming Alloys, 2002, Plenum Publishing Corporation, Oxidation of Metals vol. 58, p. 23-40 (Year: 2002).*

(Continued)

*Primary Examiner* — Anthony M Liang
*Assistant Examiner* — Jacob J Gusewelle
(74) *Attorney, Agent, or Firm* — Jeffrey D. Frantz (57) ABSTRACT

An environmentally resistant alloy is disclosed having a transition metal that upon being included in the Ni Cr Al alloy causes no liquid phases below 1310° C., creates over 45% of a gamma phase above 900° C. up to 1310° C., creates over 30% comprised of a gamma prime phase between 450° C. and 600° C., and wherein the gamma prime phase is characterized by a formula $(Ni,Co)_x(Cr,Al,Mo)_y$ wherein x and y are integers.

20 Claims, 9 Drawing Sheets

(56) References Cited

U.S. PATENT DOCUMENTS

| | | |
|---|---|---|
| 2005/0244296 A1 | 11/2005 | Beck et al. |
| 2011/0200838 A1 | 8/2011 | Thomas et al. |
| 2020/0377987 A1 | 12/2020 | Han et al. |

FOREIGN PATENT DOCUMENTS

| | | | | |
|---|---|---|---|---|
| JP | 2003253362 | A | * | 9/2003 |
| JP | 2005015853 | A | * | 1/2005 |
| JP | 2011001606 | A | * | 1/2011 |
| JP | 2011068961 | A | * | 4/2011 |

OTHER PUBLICATIONS

Kuboki, Grain Refinement and Superplasticity in Ni—30Cr—5Al Alloy, 1988, J-STAGE, Tetsu-to-Hagane vol. 74, p. 87 (Year: 1988).*

Kay, Thermal spray applications in the steel industry, 2013, ASM Handbook vol. 5A, ASM International, p. 324-327 (Year: 2013).*

Ueta et al., (2010) Influence of Al on Kinetics of Discontinuous Precipitation in Ni—38Cr Alloy, ISIJ International, vol. 50, No. 11, pp. 1676-1682.

Ustinovshchikov, (2013) Structures of Ni40Cr60 and Ni68Cr32 Alloys after Heat Treatment at Various Temperatures, Russian Metallurgy (Metally), vol. 2013, No. 9, pp. 691-698.

International Search Report and Written Opinion of the International Patent Application No. PCT/US2020/070640 dated Jan. 29, 2021, 12 pages.

* cited by examiner

| | Cr wt.% | Al wt.% | Mo wt.% | Co wt.% | Ni wt.% | Output | Min Number of Phases @ 450-600°C | % Gamma Prime @ 450-600°C | Sigma or Mu phases @ 450-600°C | % Gamma Prime @ 900°C | % Gamma at 900°C | % Beta Cr at 900°C | Ni2M onset T in °C | Liquidus (°C) | Solidus (°C) | Freezing range (°C) |
|---|---|---|---|---|---|---|---|---|---|---|---|---|---|---|---|---|
| 1 | 36.00 | 3.10 | 1.75 | 0.00 | 59.15 |  | 3.0 | 40.3 | No | 0.0 | 90.8 | 9.2 | 558.5 | 1360.0 | 1348.8 | 11.2 |
| 2 | 36.00 | 5.10 | 0.25 | 0.00 | 58.65 |  | 3.0 | 69.0 | No | 29.0 | 53.3 | 17.7 | 555.1 | 1346.7 | 1335.9 | 10.8 |
| 3 | 32.00 | 4.10 | 3.25 | 0.00 | 60.65 |  | 4.0 | 51.3 | Yes | 1.8 | 90.9 | 7.3 | 561.1 | 1354.9 | 1342.1 | 12.8 |
| 4 | 32.00 | 3.10 | 0.25 | 0.00 | 64.65 |  | 3.0 | 39.0 | No | 0.0 | 98.8 | 1.8 | 554.8 | 1375.8 | 1368.8 | 7.0 |
| 5 | 36.00 | 5.10 | 1.75 | 0.00 | 57.15 |  | 3.0 | 65.4 | No | 29.6 | 51.2 | 19.2 | 559.4 | 1340.0 | 1327.2 | 12.8 |
| 6 | 32.00 | 5.10 | 0.25 | 0.00 | 62.65 |  | 3.0 | 68.3 | No | 22.8 | 66.8 | 10.5 | 554.9 | 1357.1 | 1346.4 | 10.7 |
| 7 | 28.00 | 3.10 | 1.75 | 0.00 | 67.15 |  | 3.0 | 40.6 | No | 0.0 | 100.0 | 0.0 | 558.1 | 1380.5 | 1372.3 | 8.2 |
| 8 | 36.00 | 4.10 | 3.25 | 0.00 | 56.65 |  | 4.0 | 51.3 | Yes | 7.6 | 77.6 | 14.8 | 561.1 | 1343.6 | 1329.6 | 14.0 |
| 9 | 32.00 | 3.10 | 3.25 | 0.00 | 61.65 |  | 3.0 | 40.0 | Yes | 0.0 | 96.6 | 3.4 | 561.1 | 1364.2 | 1352.2 | 12.0 |
| 10 | 28.00 | 5.10 | 1.75 | 0.00 | 65.15 |  | 3.0 | 66.0 | No | 17.6 | 77.9 | 4.4 | 558.8 | 1361.8 | 1350.0 | 11.8 |
| 11 | 28.00 | 5.10 | 3.25 | 0.00 | 63.65 |  | 4.0 | 63.8 | Yes | 18.7 | 75.6 | 5.8 | 561.1 | 1355.8 | 1342.6 | 13.2 |
| 12 | 28.00 | 4.10 | 3.25 | 0.00 | 64.65 |  | 4.0 | 51.7 | Yes | 0.0 | 99.8 | 0.2 | 561.1 | 1366.1 | 1354.6 | 11.5 |
| 13 | 28.00 | 5.10 | 0.25 | 0.00 | 66.65 |  | 3.0 | 67.5 | No | 16.5 | 80.2 | 3.1 | 554.9 | 1367.5 | 1357.1 | 10.4 |
| 14 | 32.00 | 5.10 | 1.75 | 0.00 | 61.15 |  | 3.0 | 66.0 | No | 23.6 | 64.6 | 11.8 | 559.1 | 1350.8 | 1338.4 | 12.4 |
| 15 | 36.00 | 3.10 | 3.25 | 0.00 | 57.65 |  | 4.0 | 38.8 | Yes | 0.0 | 89.6 | 10.4 | 561.1 | 1353.0 | 1339.2 | 13.8 |
| 16 | 28.00 | 3.10 | 3.25 | 0.00 | 65.65 |  | 3.0 | 39.4 | No | 0.0 | 100.0 | 0.0 | 561.0 | 1375.1 | 1364.9 | 10.2 |
| 17 | 36.00 | 4.10 | 1.75 | 0.00 | 58.15 |  | 3.0 | 50.3 | No | 6.1 | 80.5 | 13.3 | 558.9 | 1350.2 | 1339.0 | 11.2 |
| 18 | 28.00 | 4.10 | 1.75 | 0.00 | 66.15 | | 3.0 | 53.6 | No | 0.0 | 100.0 | 0.0 | 558.1 | 1372.0 | 1362.1 | 9.9 |

FIG.4

| | Cr wt. % | Al wt. % | Mo wt. % | Co wt. % | Ni wt. % | Output | Min Number of Phases @ 450-600°C | % Gamma Prime @ 450-600°C | Sigma or Mu Phases @ 450- | % Gamma Prime @ 900°C | % Gamma at 900°C | % Beta Cr at 900°C | Ni2M onset T in °C | Liquidus (°C) | Solidus (°C) | Freezing Range (°C) |
|---|---|---|---|---|---|---|---|---|---|---|---|---|---|---|---|---|
| 35 | 30.00 | 4.25 | 1.75 | 1.00 | 63.00 | | 3.0 | 55.1 | No | 0.2 | 96.9 | 3.0 | 532.6 | 1365.0 | 1354.3 | 10.7 |
| 36 | 30.00 | 4.25 | 2.00 | 1.00 | 62.75 | | 3.0 | 54.7 | No | 0.5 | 96.2 | 3.3 | 533.2 | 1363.9 | 1353.0 | 10.9 |
| 37 | 30.00 | 4.25 | 2.25 | 1.00 | 62.50 | | 3.0 | 54.3 | No | 0.8 | 95.7 | 3.5 | 533.8 | 1362.9 | 1351.6 | 11.3 |
| 38 | 30.00 | 4.25 | 2.50 | 1.00 | 62.25 | | 3.0 | 53.9 | No | 1.1 | 95.2 | 3.7 | 534.3 | 1361.9 | 1350.3 | 11.6 |
| 39 | 30.00 | 4.25 | 3.00 | 1.00 | 61.75 | | 4.0 | 53.2 | Yes | 0.0 | 94.2 | 4.2 | 548.8 | 1360.0 | 1347.5 | 12.5 |
| 40 | 30.00 | 4.25 | 3.50 | 1.00 | 61.25 | | 4.0 | 53.1 | Yes | 2.2 | 93.2 | 4.6 | 534.1 | 1357.8 | 1344.7 | 13.1 |
| MAX | 30.0 | 4.3 | 3.5 | 1.0 | 63.0 | | 4.0 | 55.1 | | 2.2 | 96.9 | 4.6 | 534.8 | 1365.0 | 1354.3 | 13.1 |
| MIN | 30.0 | 4.3 | 1.8 | 1.0 | 61.3 | | 3.0 | 53.1 | | 0.0 | 93.2 | 3.0 | 532.6 | 1357.8 | 1344.7 | 10.7 600°C |

FIG. 5

| | Cr wt. % | Al wt. % | Mo wt. % | Co wt. % | W wt. % | Ni wt. % | Output | % Gamma Prime@ 450-600°C | % Gamma Prime @ 500-600°C | % Gamma Prime @ 900°C | % Gamma at 900°C | % Beta Cr at 900°C | Ni2M onset T in °C |
|---|---|---|---|---|---|---|---|---|---|---|---|---|---|
| 45 | 30.00 | 4.50 | 1.50 | 2.00 | 0.00 | 62.00 |  | 3 | 57.9 | 5.4 | 90.3 | 4.3 | 500 |
| 46 | 32.00 | 4.50 | 1.50 | 2.00 | 0.00 | 60.00 |  | 3 | 57.9 | 8.42 | 83.5 | 8.08 | 495.9 |
| 47 | 32.00 | 4.50 | 1.75 | 2.00 | 0.00 | 59.75 |  | 3 | 57.4 | 8.7 | 83.1 | 8.2 | 496.6 |
| 48 | 34.00 | 4.50 | 1.50 | 2.00 | 0.00 | 58.00 |  | 3 | 57.8 | 11.8 | 76.8 | 11.4 | 491.1 |
| 49 | 34.00 | 4.50 | 1.75 | 2.00 | 0.00 | 57.75 |  | 3 | 57.2 | 11.7 | 76.3 | 12 | 491.9 |
| 50 | 33.00 | 4.50 | 1.75 | 2.00 | 0.00 | 58.75 |  | 3 | 57.3 | 10.2 | 79.7 | 10.1 | 494.3 |
| 51 | 33.00 | 4.50 | 1.75 | 2.00 | 1.00 | 57.75 |  | 3 | 56.8 | 13.6 | 74.7 | 11.7 | 491.9 |
| MAX | 34.00 | 4.50 | 2.00 | 2.00 | 2.00 | 62.75 | 0.00 | 3.00 | 57.90 | 13.60 | 96.80 | 12.00 | 533.16 |
| MIN | 30.00 | 4.25 | 1.50 | 2.00 | 0.00 | 57.75 | 0.00 | 3.00 | 53.01 | 4.10 | 74.70 | 4.30 | 491.10 |

HARD NICKEL-CHROMIUM-ALUMINUM ALLOY FOR OILFIELD SERVICES APPARATUS AND METHODS

CROSS-REFERENCE TO RELATED APPLICATIONS

None.

FIELD OF THE DISCLOSURE

Aspects of the disclosure relate to hydrocarbon Exploration and Production. More specifically, aspects of the disclosure relate to hard, wear, and corrosion resistant metallic materials, referred as nickel-chromium-aluminum alloys in use for oilfield service work.

BACKGROUND INFORMATION

In hydrocarbon Exploration and Production, hard materials are commonly in use for oilfield service operations that will see or experience wear. For example, these hard materials are used to combat abrasion, erosion, and other forms of component surface damage. Tungsten carbide cermets (carbide-metal composites) are often by default the materials of choice, finding practical applications in flow control (valves, actuators, chokes, well heads, blow out preventers, manifolds), drilling equipment (drill bits, LWD/MWD, mud motors, turbines, rotary steerable, reamers), as well as fishing tools, junk mills, coring tools, gears, wheels, among others. These materials provide several advantages to common materials, however, cermets have other distinct drawbacks.

Figure 1:
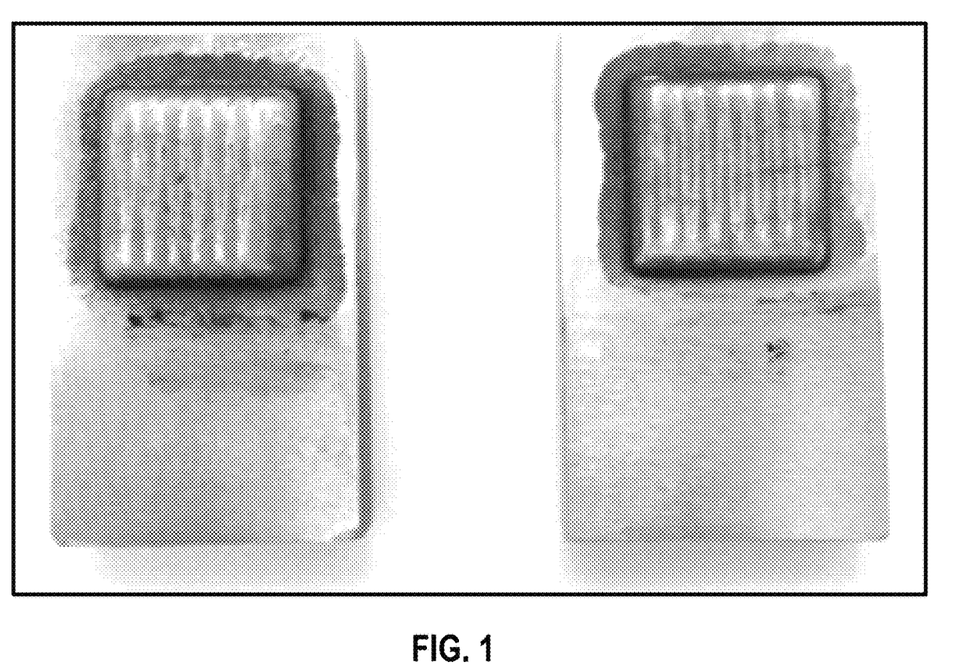
FIG. 1 is a depiction of a prior art laser deposited hard alloy used in conventional applications.

Cermets such as tungsten carbide with nickel or cobalt-rich metal binders are macroscopically harder and more wear resistant than conventional metals and alloys, while softer than typical ceramics and as such are more limited in hardness and pure abrasive wear. However, cermets can be commonly engineered to offer satisfactory compromises in hardness, wear resistance, and toughness. Both hard alloys and cermets are extensively used in the oilfields for both drilling applications and production applications, namely to increase abrasive wear and/or minimize erosion. FIG. 1 illustrates a prior-art laser deposition of a hard alloy material, comprising nickel, chromium, boron, among other alloying elements that in-situ form carbide and boride hard particles. Such hard alloys are frequently used for wear bands in drilling application, precisely to reduce wear on drill pipes and collars. As can be seen in FIG. 1, the deposit is subject to significant cracking due to its high hardness (in excess of 55 HRC, Hardness Rockwell Scale), a characteristic that inherently limits use of this hard material and other similar hard materials in many oilfield applications, especially for long-term production applications. In other embodiments, tungsten carbide cermets, combining some of the best mechanical properties of carbide ceramics and metals or alloys, are used. These tungsten carbide cermets, however, share similar major technical deficiencies for oilfield applications as the hard alloy of FIG. 1. A short list of limitations for cermets (including tungsten carbide cermets) is provided below:

(1) These materials are not readily fusible and applied onto a part, unless the ceramic phase (carbide phase) is less than approximately 60% and complemented by a highly fusible metallic binder, itself representing a minimum of 40% of the total material;

(2) These materials are highly subject to internal cracking when applied by a fusible process; these cracks may not be critical for erosion service, but may be inadequate for certain surfaces (e.g. sealing surface of static and dynamic seals);

(3) These materials may lack general corrosion resistance because of the binders usually in use. These often include a cobalt along chromium carbides. Due to insufficient chromium and molybdenum in solid-solution, corrosion resistance may be limited for some applications, especially long-term;

(4) These materials are not available to many additive manufacturing (AM) processes such as direct energy deposition or powder bed fusion;

(5) These materials are brittle, therefore may require special precautions for their handling. Further, these materials may not be compatible with thermal cycling, including rapid cooling, as may be required while manufacturing components with such materials.

Co—Cr alloys and cast-irons offer other advantages, namely for casting, but are fusible only with restricted hardness values to approximately 40 in order to remain crack free. Tool steels offer proper hardness, but also lack toughness, and cracking resistance, including during sour service (in the presence of $H_2S$). Above 40 to 50 Rockwell Hardness rating, approximately, fusible alloys have a strong tendency towards cracking. In summary, such hard materials can develop visible cracking as early as when manufactured (FIG. 1), or during service, as when exposed to corrosive environments (for instance with $H_2S$).

As the conventional materials above have deficiencies, there is a need to provide a material that may be used in oilfield service work that can withstand the expected service loads present in oilfield service environments.

There is a further need to provide a material that is economical to manufacture compared to conventional materials, and implicitly this material is fusible and crack-resistant at the time it is produced.

There is a further need to provide a material that is easy to produce in volume to satisfy the needs of oilfield service operators.

There is a still further need to provide a material that may be formed into required shapes using casting, additive manufacturing, welding, among other processes, for eventual use in oilfield service applications.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, an environmentally or corrosion resistant alloy is disclosed. The material comprises a transition metal that upon being included in a Ni Cr Al alloys causes no liquid phase below 1310° C., creates over 45% of a gamma phase above 900° C. up to 1310° C., and creates over 30% of a gamma prime phase between 450° C. and 600° C., wherein the gamma prime phase is characterized by a formula $(Ni,Co)_x(Cr,Al,Mo)_y$ wherein x and y are integers.

In another example embodiment, a cermet material is disclosed. The cermet material comprises one or more ceramics, generally in the form of particulates. The cermet material also comprises a Ni Cr Al alloy binder placed within the particulates, the alloy binder may comprise a transition metal that upon being included in the Ni Cr Al alloy causes no liquid phase below 1310° C., creates over 45% of a gamma phase above 900° C. up to 1310° C., and creates over 30% comprised of a gamma prime phase between 450° C. and 600° C., wherein the gamma prime phase is characterized by a formula $(Ni,Co)_x(Cr,Al,Mo)_y$, wherein x and y are integers.

In another example embodiment, a cermet is disclosed. The cermet comprises tungsten carbides, generally provided as particulates. The cermet material also comprises a Ni Cr Al alloy binder placed within the particulates, the alloy binder may comprise a transition metal that upon being included in the Ni Cr Al alloy causes no liquid phase below 1310° C., creates over 45% of a gamma phase above 900° C. up to 1310° C., and creates over 30% comprised of a gamma prime phase between 450° C. and 600° C., wherein the gamma prime phase is characterized by a formula $(Ni,Co)_x(Cr,Al,Mo)_y$ wherein x and y are integers.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments.

While the embodiments described herein are susceptible to various modifications and alternative forms, specific embodiments have been shown by way of example in the drawings and will be described in detail herein. The embodiments described herein are not intended, however, to be limited to the particular forms disclosed. Rather, the instant disclosure covers all modifications, equivalents, and alternatives falling within the scope of the appended claims.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and shall not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged to, connected to, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Figure 2:
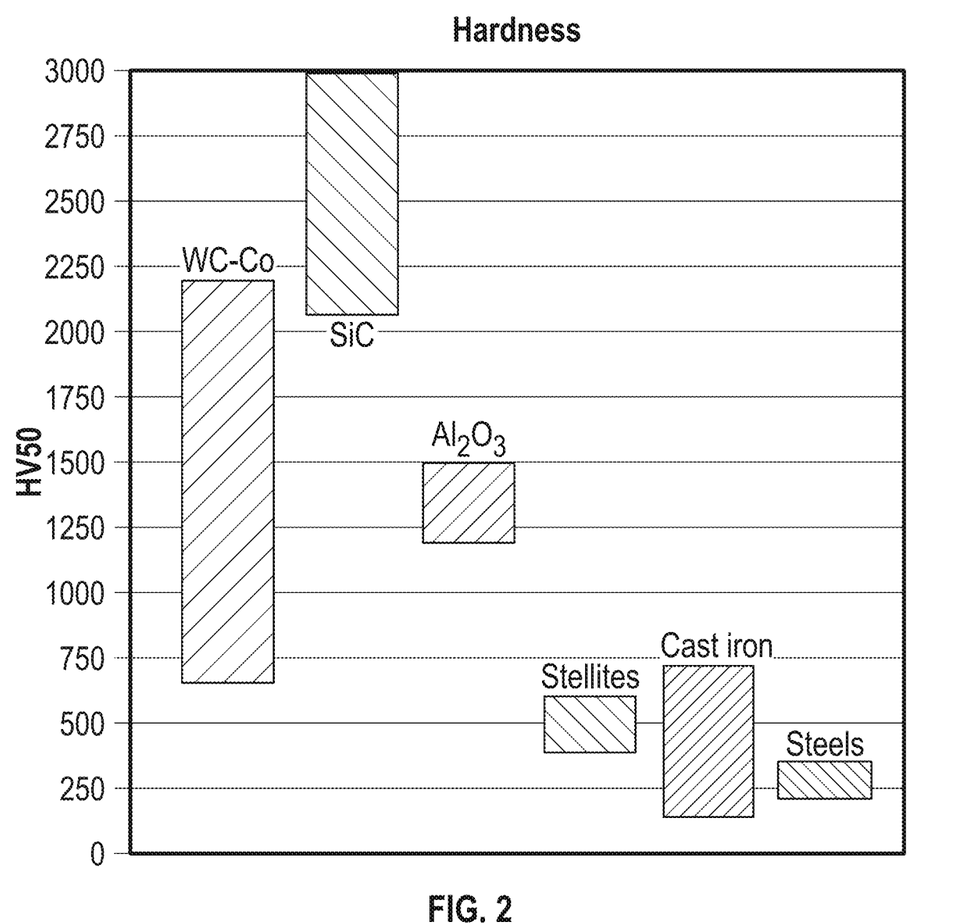
FIG. 2 is a comparison of major material properties.

Abnormally hard, wear and corrosion resistant fusible alloys for casting, welding, powder metallurgy, and additive manufacturing tailored to oilfield Exploration & Production environments are disclosed. The novel alloys are hardened by gamma prime $(Ni,Co)_x(Cr_a,Al_b,M_c)$ intermetallic phases upon low-temperature heat treatments to ensure unusual crack-free deposits with highly unusual hardness (typically 50 to 65 HRC). These alloys can replace the Co—Cr alloys and in applications can compete with the carbide-metal cermets, yet are normally carbide-free, non-magnetic and exhibit superior corrosion resistance. The alloys, when shaped by the disclosed processes, can be used in flow diverters, pump stages (impellers, diffusers), turbines, blenders, chokes, valve trunnions, cages, seats, ICDs, pads, bushings, bearings, stabilizers, wear bands, as well as claddings to low-alloy steels and normal corrosion-resistant alloys (CRAs), for instance for the internal and external surfaces of pressure housings. These alloys may also be applied as binder to ceramics, including tungsten carbides (e.g., 60% WC+40% of the novel alloy), for instance for drilling bearing applications. Claimed are inventive alloys of nickel (Ni) with 28.0 to 36.0 wt. % chromium (Cr), 3.10 to 5.10 wt. % aluminum (Al), 0.25 to 3.50 wt. % molybdenum (Mo), optionally up to 2.0 wt. % cobalt (Co) and 2.0 wt. % tungsten (W), and their methods of use in oilfield parts and products. Aspects of the disclosure provide crack-free fusible alloys with unusual hardness values compared to commercially available materials after heat-treatment. The alloys have been designed per a set of criteria derived from computational materials design first, then reduced order regression models. The following was used as criteria:

Minimal number of intermetallic phases between 450 to 600° C., with a preference for
450 to 600° C. is a proprietary heat-treatment, not detailed in the herein disclosure
% Gamma Prime: Measures the percentage of the gamma prime intermetallic phase forming under equilibrium (vert slow cooling) conditions between 450 and 600° C., with an inclination for values between 30% and 70%
Sigma and Mu phases: A strong preference for a total absence of Sigma and Mu intermetallic phases in the 450 to 600° C.
% Gamma prime at 900° C.: Measures the percentage of Gamma phase at 900° C., with a preference for less than 30%
% Gamma at 900° C.: Measures the percentage of gamma phase at 900° C., with an inclination for values more than 70%
% Beta Cr at 900° C.: Relates to the percentage the chromium bcc phase forming under equilibrium with values at a temperature of 900° C., with a preference for less than 25 wt. %
$Ni_2M$ onset temperature in ° C.: Relates to the temperature at which the $Ni_2M$ intermetallic phase forms, with a preference for onset temperature below 550° C.
Liquidus and solidus temperatures: Preference to have them as possible to each other to promote a narrow freezing range FIG. 2 shows a laser deposited & fused alloy that is fulfilling many of the above criteria. It may be seen on the left that the deposit, from additive manufacturing, is crack-free. Upon heat-treatment, the alloy is also seen to harden from less than 22 to 58 Rockwell hardness, and still maintain a crack-free microstructure, including along the interface with the base material (right picture).

Figure 3A:
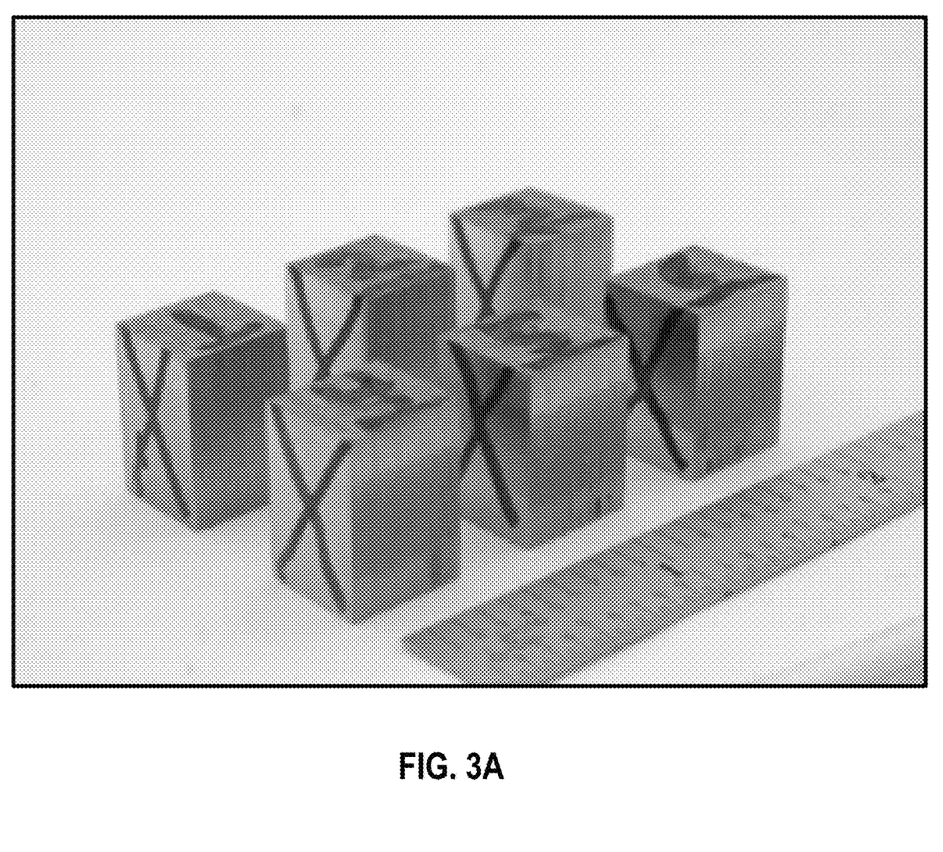
FIG. 3A illustrates blocks of material produced by additive manufacturing.
Figure 3B:
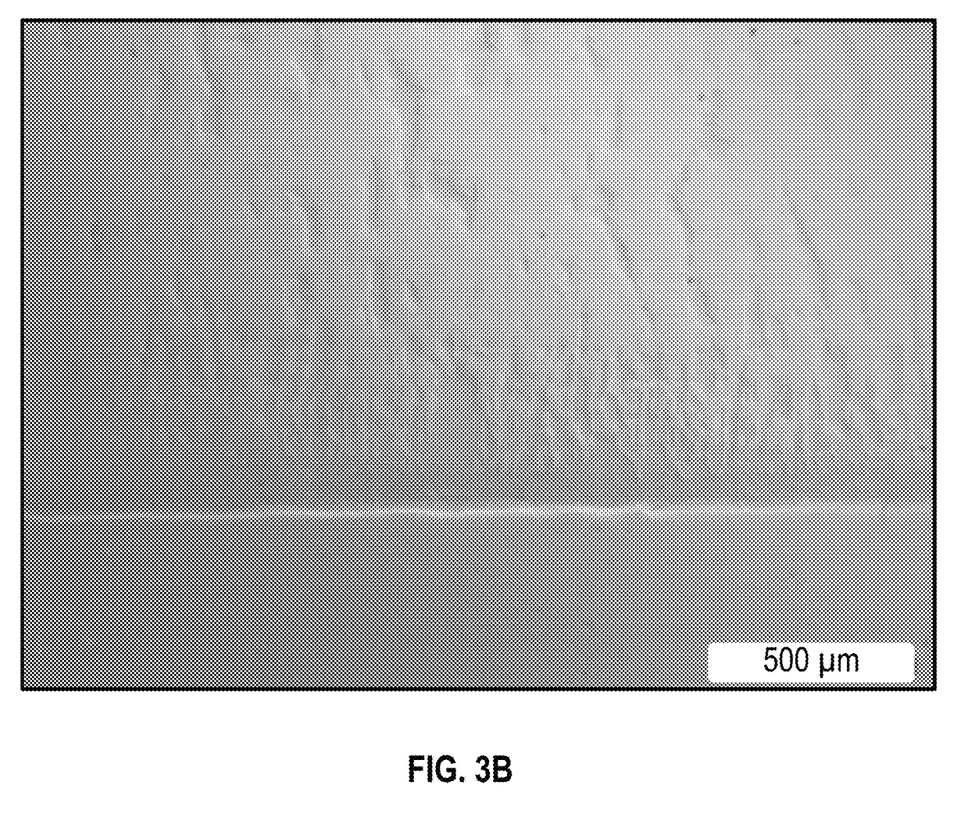
FIG. 3B illustrates an interface between an aspect of the disclosure and a low alloy steel substrate.
Figure 3C:
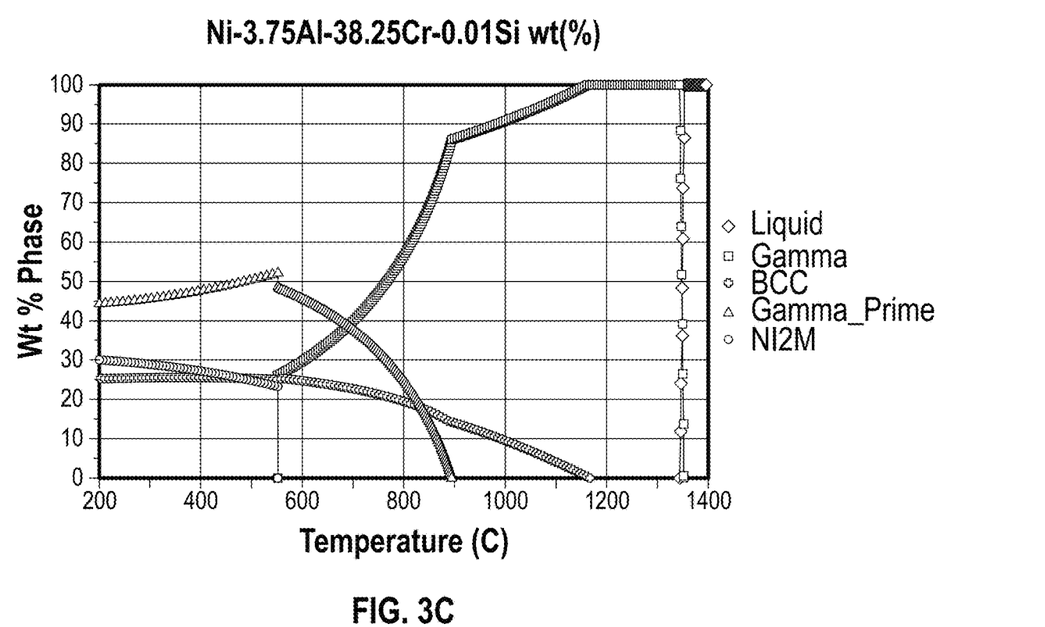
FIG. 3C is a graph of an equilibrium phase diagram for an aspect of the disclosure described.

Referring to FIG. 3A, blocks of alloy material satisfying the requirements of the disclosures, is illustrated. In this figure, the blocks of material were prepared using an additive manufacturing process. Referring to FIG. 3B, an interface between alloy material and a low-alloy steel substrate is illustrated. In this illustration, cracks are not present. Referring to FIG. 3C, a plot showing an equilibrium phase diagram is presented. Phases are shown that are present between ambient and melting. Designated by circles are some of the above design criteria, with the above alloy establishing a "benchmark" that has been successfully constructed.

Figure 4:
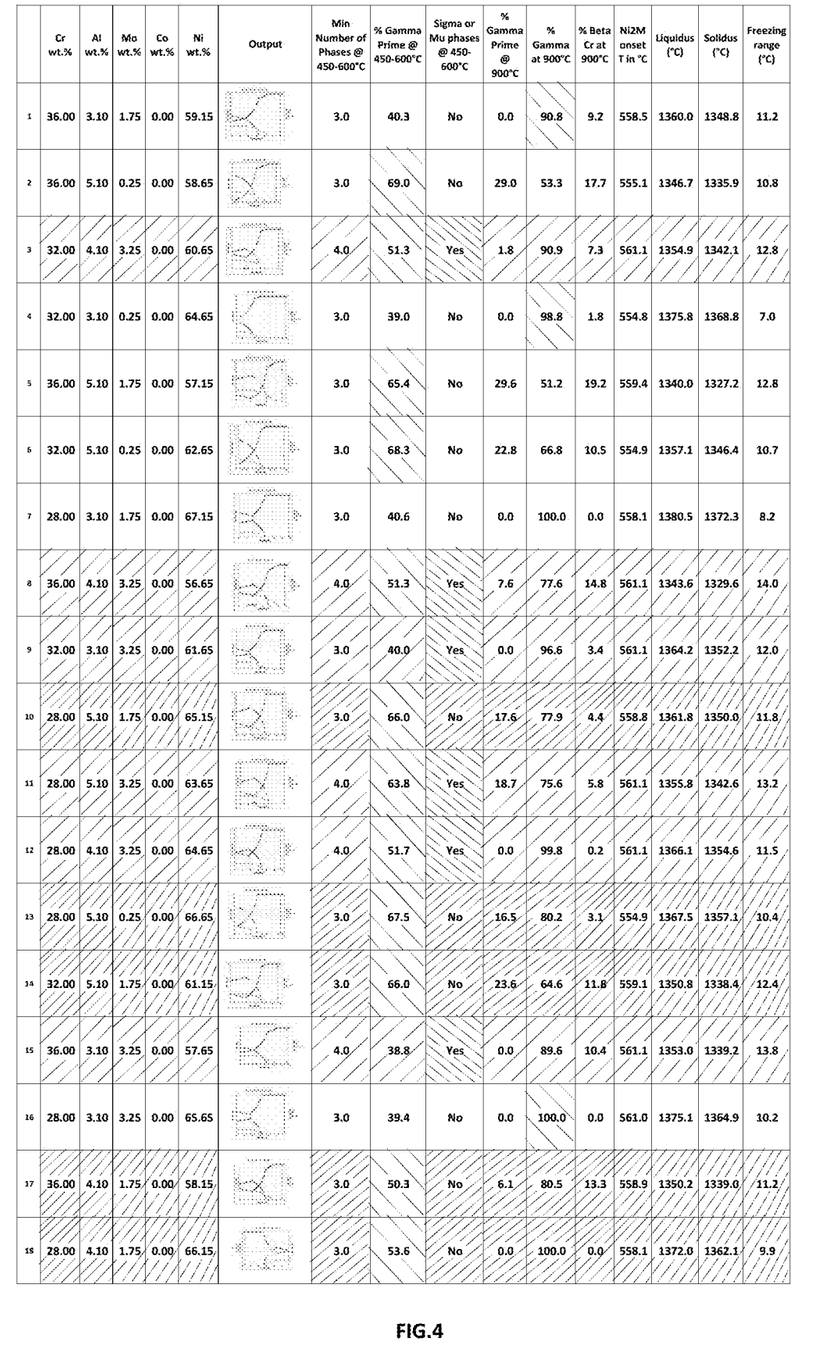
FIG. 4 is a list of alloys in accordance with one example embodiment of the disclosure.

FIG. 4 is a list of inventive alloys largely designed based on a first experimental trial, then strict criteria as earlier described, and various iterations of Design of Experiments utilizing computational thermodynamics (full factorial DOE). The results presented in the next tables are solely computational, and rely on key attributes from the successful manufacturing and testing of the alloy of FIG. 2. Unlike prior-art, this invention uses Mo and W as mean to specifically improve corrosion resistance for oilfield services, while Cr and Al are still in use in the disclosed ratio to promote the hard gamma prime phase. Experimental trials on alloys herein disclosed are ongoing, with results later available for inclusion if needed.

Figure 5:
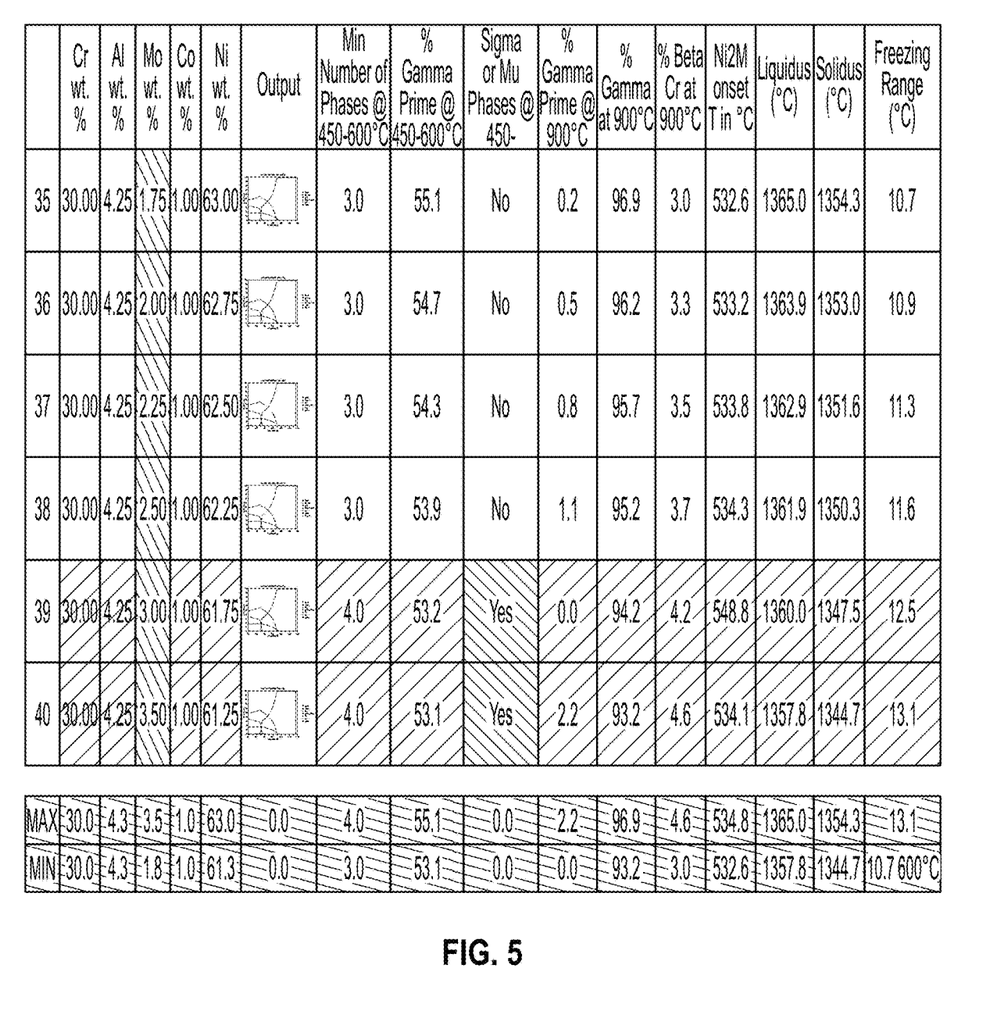
FIG. 5 is a list of the alloys of FIG. 4 with the addition of Mo and the physical effects of this placement.

FIG. 5 is a list of the alloys of FIG. 4 with the addition of Mo and the physical effects of this placement.

Figure 6:
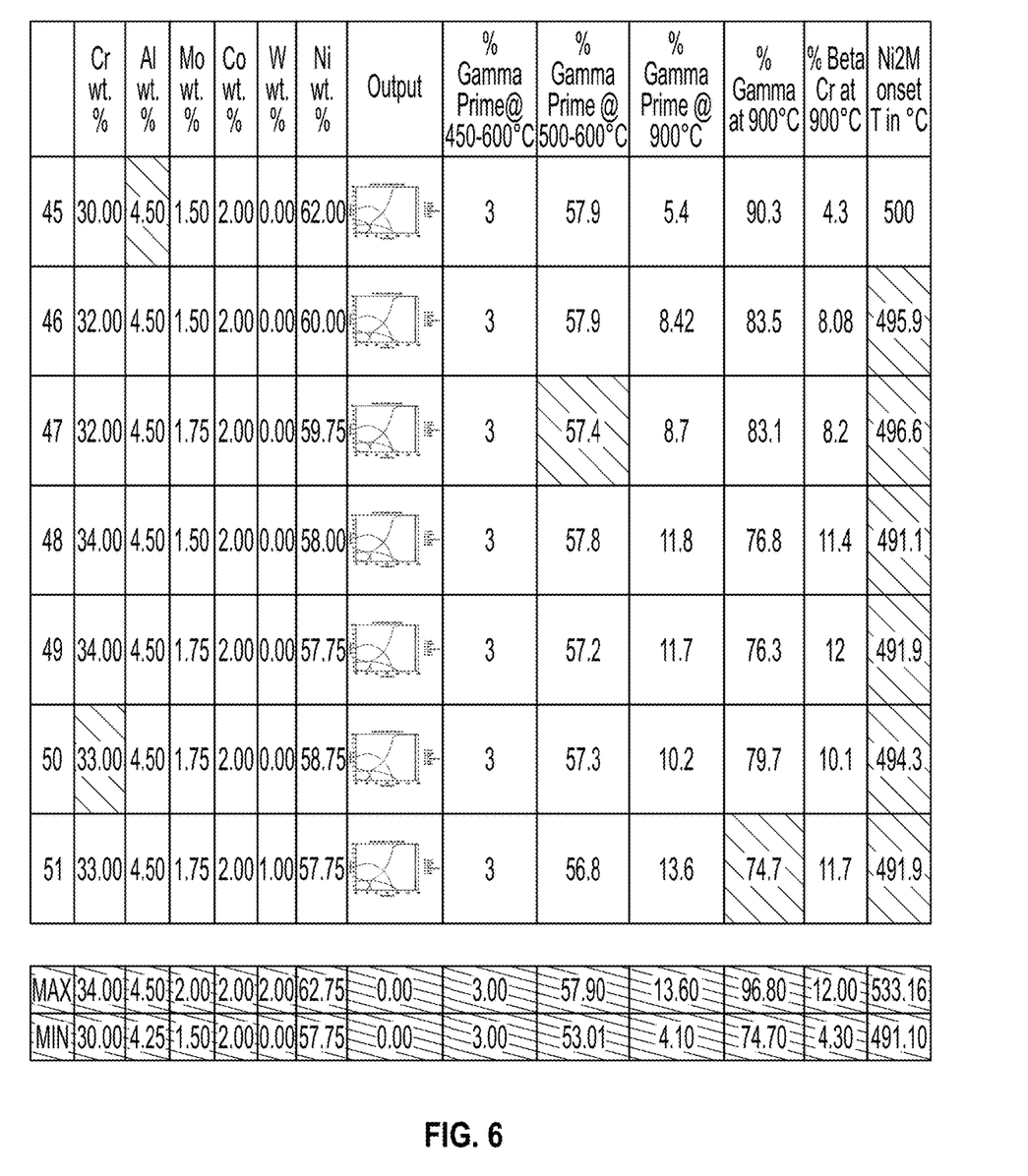
FIG. 6 is a list of alloys that investigates the role of W, as partial substitute or complementary to Mo.

FIG. 6 is a list that investigates the role of W, as partial substitute or complementary to Mo, and aims at also reducing the $Ni_2M$ onset temperature below 500° C.

Figure 7:
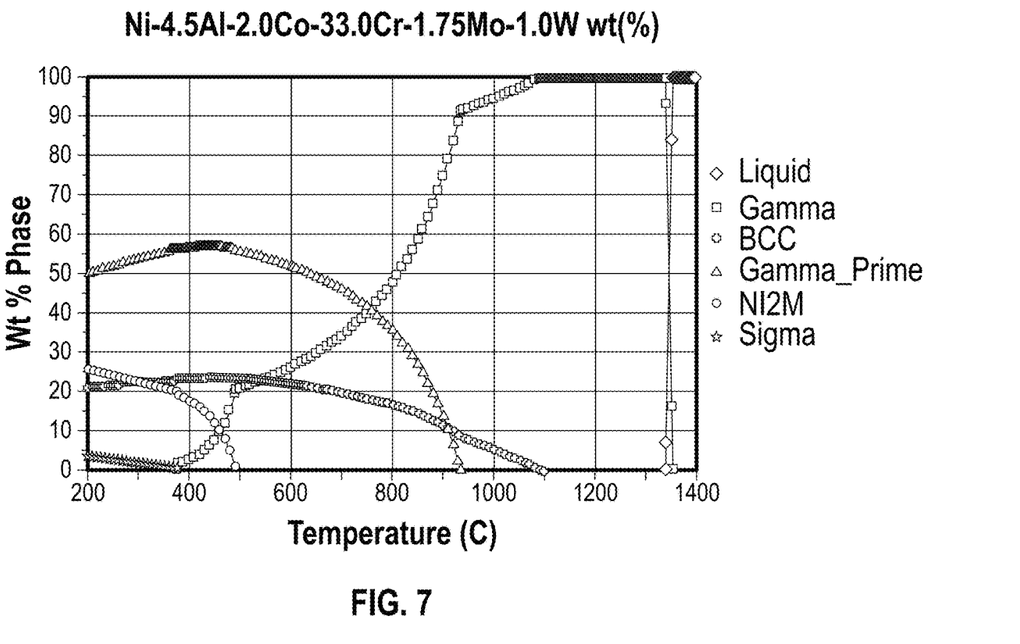
FIG. 7 is a graph of weight percent phase vs. temperature of alloys in accordance with an example embodiment of the disclosure.

FIG. 7 is a semi-optimized figure of alloys per the disclosed criteria; i.e., offers increased gamma prime at lower temperature, has reduced Mu phase formation temperature (i.e., more heat-treatable, as desired), offers a wide range of high-temperature gamma phase, and has a composition that comprises Mo and W.

Both Mo and W are well known to contribute to corrosion resistance. Their inclusion as an Ni Cr Al composition is novel, and simply driven by the oilfield methods of use. Super-alloys have traditionally been developed for the aerospace, where corrosion is not a primary concern. In this figure, a graph of weight percentage vs temperature is illustrated, with highlighted areas, indicating where example embodiments of the disclosure are present.

In one example embodiment, an environmentally resistant alloy material, is disclosed. The material may comprise a transition metal that upon being included in the Ni Cr Al alloy causes no liquid phases below 1310° C., creates over 45% of a gamma phase above 900° C. up to 1310° C., creates over 30% comprised of a gamma prime phase between 450° C. and 600° C., and wherein the gamma prime phase is characterized by a formula $(Ni,Co)_x(Cr,Al,Mo)_y$, wherein x and y are integers.

In another example embodiment, the material may be configured wherein the transition metal is cobalt.

In another example embodiment, the material may be configured wherein the transition metal is molybdenum.

In another example embodiment, the material may be configured wherein the transition metal is tungsten.

In another example embodiment, the material may be configured wherein the Ni is greater than or equal to 55 weight percent, the Cr is greater than or equal to 28 weight percent and up to 36 weight percent; the Al is greater than or equal to 3.1 weight percent and up to 5.1 weight percent, and the Mo is up to 3.5 weight percent.

In another example embodiment, the material may be configured wherein the W is up to 2.0 weight percent.

In another example embodiment, the material may be configured wherein the Ni is greater than or equal to 61 weight percent, the Cr is greater than or equal to 30 weight percent and up to 34 weight percent; the Al is greater than or equal to 4 weight percent and up to 5.1 weight percent, the Mo is up to 3.5 weight percent and the W is up to 3.5 weight percent.

In another example embodiment, the material may be configured wherein the alloy is less than 35 HRC in hardness before heat treatment.

In another example embodiment, the material may be configured wherein the alloy is greater than 50 HRC in hardness after a heat treatment.

In another example embodiment, a cermet material is disclosed comprising a ceramic matrix and a Ni Cr Al alloy binder placed within the ceramic matrix, the alloy binder may comprise a transition metal that upon being included in the Ni Cr Al alloy causes no liquid phase below 1310° C., creates over 45% of a gamma phase above 900° C. up to 1310° C., and creates over 30% comprised of a gamma prime phase between 450° C. and 600° C., wherein the gamma prime phase is characterized by a formula $(Ni,Co)_x(Cr,Al,Mo)_y$ wherein x and y are integers.

In another example embodiment, the alloy binder may be configured wherein the transition metal is cobalt.

In another example embodiment, the alloy binder may be configured wherein the transition metal is molybdenum.

In another example embodiment, the alloy binder may be configured wherein the transition metal is tungsten.

In another example embodiment, the alloy binder may be configured wherein the Ni is greater than or equal to 55 weight percent, the Cr is greater than or equal to 28 weight percent and up to 36 weight percent, the Al is greater than or equal to 3.1 weight percent and up to 5.1 weight percent, and the Mo is up to 3.5 weight percent.

In another example embodiment, an alloy is disclosed comprising a tungsten carbide matrix and a Ni Cr Al alloy binder placed within the tungsten carbide matrix, the alloy binder may comprise a transition metal that upon being included in the Ni Cr Al alloy causes no liquid phases below 1310° C., creates over 45% of a gamma phase above 900° C. up to 1310° C., and creates over 30% comprised of a gamma prime phase between 450° C. and 600° C., wherein the gamma prime phase is characterized by a formula $(Ni,Co)_x(Cr,Al,Mo)_y$ wherein x and y are integers.

In another example embodiment, the alloy binder may be configured wherein the transition metal is cobalt.

In another example embodiment, the alloy binder may be configured wherein the transition metal is molybdenum.

In another example embodiment, the alloy binder may be configured wherein the transition metal is tungsten.

In another example embodiment, the alloy binder may be configured wherein the Ni is greater than or equal to 55 weight percent, the Cr is greater than or equal to 28 weight percent and up to 36 weight percent; the Al is greater than or equal to 3.1 weight percent and up to 5.1 weight percent, and the Mo is up to 3.5 weight percent.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

What is claimed is:

1. A cermet material, comprising:
a ceramic material; and
an alloy material comprising a transition metal included in a Ni Cr Al alloy that causes no liquid phase below 1310° C., creates over 45% of a gamma phase above 900° C. up to 1310° C., and creates over 30% comprised of a gamma prime phase between 450° C. and 600° C., and the gamma prime phase is characterized by a formula $(Ni,Co)_x(Cr,Al,Mo)_y$, wherein x and y are integers, wherein an amount of the Al in the alloy material is 3.1 weight percent to 5.1 weight percent, wherein the transition metal comprises at least one of Co, Mo, and W, wherein a weight percent of the alloy material in the cermet material is 40%, and wherein a ratio of an amount of the ceramic material to an amount of the alloy material is less than 1.5.

2. The cermet material of claim 1, wherein:
the transition metal comprises Mo,
an amount of the Ni in the alloy material is greater than or equal to 55 weight percent,
an amount of the Cr in the alloy material is greater than or equal to 28 weight percent and up to 36 weight percent,
an amount of the Mo in the alloy material is up to 3.25 weight percent, and the alloy material is free of W.

3. The cermet material of claim 1, wherein:
the transition metal comprises Mo and W,
an amount of the Ni in the alloy material is greater than or equal to 55 weight percent,
an amount of the Cr in the alloy material is greater than or equal to 28 weight percent and up to 36 weight percent,
an amount of the Mo in the alloy material is up to 2 weight percent, and
an amount of the W in the alloy material is up to 2 weight percent.

4. The cermet material of claim 1, wherein the alloy material is 300 HVN in hardness before heat treatment, and wherein the alloy material is greater than 500 HVN in hardness after the heat treatment.

5. A cermet material comprising:
ceramic particulates; and
an alloy binder placed within the ceramic particulates, the alloy binder comprising a transition metal included in a Ni Cr Al alloy causes no liquid phase below 1310° C., creates over 45% of a gamma phase above 900° C. up to 1310° C., and creates over 30% comprised of a gamma prime phase between 450° C. and 600° C., wherein the gamma prime phase is characterized by a formula $(Ni,Co)_x(Cr,Al,Mo)_y$, wherein x and y are integers, wherein an amount of the Al in the alloy binder is 3.1 to 5.1 weight percent, wherein the transition metal comprises at least one of Co, Mo and W, wherein a weight percent of the alloy binder in the cermet material is 40%, and wherein a weight ratio of the ceramic particulates to the alloy binder is 1.5 or less.

6. The cermet material of claim 5, wherein:
the transition metal comprises Mo,
an amount of the Ni in the alloy binder is greater than or equal to 55 weight percent,
an amount of the Cr in the alloy binder is greater than or equal to 28 weight percent and up to 36 weight percent,
an amount of the Mo in the alloy binder is up to 3.25 weight percent, and
the alloy binder is free of W.

7. A cermet material, comprising:
tungsten carbide particulates; and
an alloy binder placed within the tungsten carbide particulates, the alloy binder comprising a transition metal included in a Ni Cr Al alloy that causes no liquid phase below 1310° C., creates over 45% of a gamma phase above 900° C. up to 1310° C., and creates over 30% comprised of a gamma prime phase between 450° C. and 600° C., wherein the gamma prime phase is characterized by a formula $(Ni,Co)_x(Cr,Al,Mo)_y$ wherein x and y are integers, wherein an amount of the Al in the alloy binder is 3.1 to 5.1 weight percent, wherein the transition metal comprises at least one of Co, Mo, and W, wherein a weight percent of the alloy binder in the cermet material is 40%, and wherein a weight ratio of the tungsten carbide particulates to the alloy binder is 1.5 or less.

8. The cermet material of claim 7, wherein:
the transition metal comprises Mo,
an amount of the Ni in the alloy binder is greater than or equal to 55 weight percent,
an amount of the Cr in the alloy binder is greater than or equal to 28 weight percent and up to 36 weight percent,
an amount of the Mo is up to 3.25 weight percent, and the alloy binder is free of W.

9. The cermet material of claim 1, wherein an amount of the Ni in the alloy material is 61 weight percent to 63.65 weight percent.

10. The cermet material of claim 1, wherein an amount of the Cr in the alloy material is 32 weight percent to 36 weight percent.

11. The cermet material of claim 1, wherein:
the transition metal comprises Mo and W,
an amount of the Mo in the alloy material is up to 2.25 weight percent, and
an amount of the W in the alloy material is up to 2 weight percent.

12. The cermet material of claim 1, wherein:
the alloy material is free of W,
the transition metal comprises Mo, and
an amount of the Mo in the alloy material is up to 3.25 weight percent.

13. The cermet material of claim 1, wherein:
the alloy material is free of W,
the transition metal comprises Mo, and
an amount of the Mo in the alloy material is up to 3 weight percent.

14. The cermet material of claim 1, wherein:
the alloy material is free of W,
the transition metal comprises Mo, and
an amount of the Mo in the alloy material is up to 2.5 weight percent.

15. The cermet material of claim 1, wherein:
the transition metal comprises Mo and optionally W,
an amount of the Cr in the alloy material is 32 weight percent to 36 percent,
an amount of the Mo in the alloy material is up to 2.5 weight percent, and
if the W is present in the alloy material, an amount of the W in the alloy material is up to 2 weight percent.

16. The cermet material of claim 1, wherein:
the transition metal comprises Co and Mo,
the alloy material is free of W,
an amount of the Co in the alloy material is up to 2 weight percent, and
an amount of the Mo in the alloy material is up to 3.25 weight percent.

17. The cermet material of claim 1, wherein:
the transition metal comprises Co, Mo, and W,
an amount of the Co in the alloy material is up to 2 weight percent,
an amount of the Mo in the alloy material is up to 2.25 weight percent, and
an amount of the W in the alloy material is up to 2 weight percent.

18. The cermet material of claim 5, wherein a weight percent of the ceramic particulates in the cermet material is 60% or less.

19. The cermet material of claim 7, wherein a weight percent of the tungsten carbide particulates in the cermet material is 60% or less.

20. The cermet material of claim 1, wherein a weight percent of the ceramic material is 60%.

* * * * *